US012712764B2

(12) United States Patent
Teli et al.

(10) Patent No.: US 12,712,764 B2
(45) Date of Patent: Aug. 18, 2026

(54) METHOD AND APPARATUS FOR PERFORMING CHANNEL ESTIMATION FOR UPLINK DATA IN NB-IoT PHYSICAL LAYER

(71) Applicant: Rakuten Symphony, Inc., Tokyo (JP)

(72) Inventors: Rajesh Girmalla Teli, Bangalore (IN); Aghil Vinayak Puzhakkal, Bangalore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 414 days.

(21) Appl. No.: 18/571,256

(22) PCT Filed: Nov. 20, 2023

(86) PCT No.: PCT/US2023/080501
§ 371 (c)(1),
(2) Date: Dec. 18, 2023

(87) PCT Pub. No.: WO2025/071643
PCT Pub. Date: Apr. 3, 2025

(65) Prior Publication Data

US 2026/0197204 A1 Jul. 9, 2026

(30) Foreign Application Priority Data

Sep. 29, 2023 (IN) ............................ 202341065508

(51) Int. Cl.
*H04L 25/02* (2006.01)
*H04W 76/28* (2018.01)

(52) U.S. Cl.
CPC ...... *H04L 25/0226* (2013.01); *H04L 25/0228* (2013.01); *H04W 76/28* (2018.02)

(58) Field of Classification Search
CPC ............. H04L 25/0202; H04L 25/0204; H04L 25/021; H04L 25/022; H04L 25/0222;
(Continued)

(56) References Cited

U.S. PATENT DOCUMENTS 7,012,881 B2 * 3/2006 Kim .................... H04L 27/2686 370/208
10,778,396 B2 * 9/2020 Hwang ................. H04L 5/0051
(Continued)

OTHER PUBLICATIONS

Beyene et al., On the Performance of Narrow-Band Internet of Things (NB-IoT), IEEE, 6 pages, Mar. 19-22, 2017.*
(Continued)

*Primary Examiner* — Frank Duong
(74) *Attorney, Agent, or Firm* — HAUPTMAN HAM, LLP

(57) ABSTRACT

A method for performing channel estimation for uplink data in NB-IoT physical layer includes receiving a plurality of uplink data signals from at least one User Equipment (UE). The method includes dividing each of the uplink data signals into a plurality of processing blocks. Each processing block includes a plurality of slots, wherein each slot includes a plurality of data symbols, a reference signal symbol and a plurality of reference signal tones. For each processing block, the method includes estimating a time offset by determining a first correlation value between the plurality of the reference signal tones within one reference signal symbol and estimating a frequency offset by determining a second correlation value between a plurality of reference signal symbols across the plurality of slots. The method includes performing channel estimation upon estimating the time offset and the frequency offset of all of the plurality of the processing blocks.

20 Claims, 5 Drawing Sheets

(58) Field of Classification Search
CPC ............. H04L 25/0226; H04L 25/0228; H04L 25/024; H04L 25/025; H04L 25/0252; H04L 25/0254; H04L 25/0256; H04L 25/03292; H04L 27/2602; H04L 27/2671; H04W 76/28
See application file for complete search history.

(56) References Cited

U.S. PATENT DOCUMENTS

| | | | | |
|---|---|---|---|---|
| 10,785,079 | B2* | 9/2020 | Dezfooliyan | H04L 27/2662 |
| 2009/0213943 | A1* | 8/2009 | Gu | H04L 25/0204<br>375/260 |
| 2012/0207254 | A1* | 8/2012 | Park | H04L 25/0256<br>375/343 |
| 2018/0234281 | A1* | 8/2018 | Dezfooliyan | H04L 27/2662 |
| 2021/0218612 | A1* | 7/2021 | Sung | H04L 5/0012 |
| 2025/0344189 | A1* | 11/2025 | Choi | H04L 25/0204 |

OTHER PUBLICATIONS

Chakrapani, NB-IoT Uplink Receiver Design and Performance Study, IEEE, 14 pages, Mar. 2020.*

Jewel et al., On Channel Estimation in LTE-Based Downlink Narrowband Internet of Things Systems, Electronics, 25 pages, May 24, 2021.*

* cited by examiner

METHOD AND APPARATUS FOR PERFORMING CHANNEL ESTIMATION FOR UPLINK DATA IN NB-IoT PHYSICAL LAYER

RELATED APPLICATIONS

The present application is a National Phase of International Application No. PCT/US2023/080501, filed Nov. 20, 2023, which claims priority based on Indian Patent Application No. 202341065508, filed Sep. 29, 2023.

TECHNICAL FIELD

The present disclosure generally relates to wireless communication systems. More particularly, the present disclosure relates to method and apparatus for performing channel estimation for uplink data in Narrow Band (NB) Internet of Things (IoT) physical layer.

BACKGROUND

NB-IoT is a wireless communication standard that defines a physical layer and a protocol stack for various IoT applications and devices of low complexity. NB-IoT operates on multiple frequency bands, allowing for wider coverage and higher data rates. It uses advanced technologies such as beamforming, massive Multiple-Input Multiple-Output (MIMO), and dynamic spectrum sharing to improve network performance and efficiency. In addition to the above, NB-IoT supports new use cases such as Massive Machine-Type Communications (mMTC) and Ultra-Reliable Low-Latency Communications (uRLLC), enabling deployment of Narrow Band (NB) Internet of Things (IoT) applications. NB-IoT utilizes intelligent architectures of radio access technology (RAT), dynamic by nature, coherent, and flexible over multiple advanced technologies that can support a wide variety of the IoT applications.

Narrowband Physical Uplink Shared Channel (NPUSCH) is a channel in NB-IoT that is used for transmitting uplink user data and control information from a User Equipment (UE) to a Base Station (BS). Precisely, in the NB-IOT applications, NB-IoT NPUSCH Format-1 carries an uplink shared channel (UL-SCH). The UL-SCH is a transport channel used for transmitting UE's uplink user data also known as a transport block, to the base station. When the base station (BS) receives encoded UL-SCH, it performs channel estimation and UL-SCH decoding to recover the original transport block.

However, in the NB-IOT applications, there are scenarios when one or more sensors of the UE from which uplink signals are to be obtained are placed at such location from where it is very difficult to detect the signals (Low Signal to Noise Ratio (SNR)), e.g., equipment/sensors placed in basements, etc. In such scenarios, existing methods of channel estimation to separate noise/interference from the uplink signal (i.e., the uplink data) are not sufficient. In addition, they cater additional problems such as existing methods do not leverage on carrier frequency offset (CFO) and time offset (TO) estimates obtained from a previous NPUSCH block for the same UE. When the CFO and TO estimates of the previous NPUSCH block are not leveraged for the channel estimation, channel estimate accuracy is quite low at lower SNRs. In other words, mean squared error (MSE) for channel estimates are high at the lower SNRs. Moreover, Signal to Interference plus Noise Ratio (SINR) threshold for Discontinuous Transmission (DTX) detection and the CFO/TO estimation are not based on interference level which can dynamically change across cells. In this case as well, the MSE for the channel estimates are high at the lower SNRs. Thus, the channel estimation accuracy is quite low.

The information disclosed in this background of the disclosure section is only for enhancement of understanding of the general background of the present disclosure and should not be taken as an acknowledgement or any form of suggestion that this information forms the prior art already known to a person skilled in the art.

SUMMARY

In an embodiment, the present disclosure discloses a method for performing channel estimation for uplink data in NB-IoT physical layer. The method comprises receiving a plurality of uplink data signals from at least one User Equipment (UE). The method further comprises dividing each of the uplink data signals into a plurality of processing blocks. Herein, each processing block of the plurality of processing blocks comprises a plurality of slots, wherein each slot of the plurality of slots comprising a plurality of data symbols, a reference signal symbol and a plurality of reference signal tones. For each processing block, the method further comprises estimating a time offset by determining a first correlation value between the plurality of the reference signal tones within one reference signal symbol and estimating a frequency offset by determining a second correlation value between a plurality of reference signal symbols across the plurality of slots. Thereafter, the method comprises performing channel estimation upon estimating the time offset and the frequency offset of all of the plurality of the processing blocks.

In an embodiment, the present disclosure discloses an apparatus for performing channel estimation for uplink data in NB-IoT physical layer. The apparatus is a base station and comprises a processor and a memory communicatively coupled to the processor. The processor is configured to receive a plurality of uplink data signals from at least one User Equipment (UE). Further, the processor is configured to divide the uplink data signal into a plurality of processing blocks. Herein, each processing block of the plurality of processing blocks comprises a plurality of slots, wherein each slot of the plurality of slots comprises a plurality of data symbols, a reference signal symbol and a plurality of reference signal tones. Furthermore, for each processing block, the processor is configured to estimate a time offset by determining a first correlation value between the plurality of the reference signal tones within one reference signal symbol and estimate a frequency offset by determining a second correlation value between a plurality of the reference symbols across the plurality of slots. Eventually, the processor is configured to perform channel estimation upon estimating the time offset and the frequency offset of all of the plurality of the processing blocks.

In an embodiment, there is a non-transitory computer readable medium including instructions stored thereon that when processed by at least one processor, cause the at least one processor to perform operations of receiving a plurality of uplink data signals from at least one User Equipment (UE). The instructions further cause the at least one processor to divide each of the uplink data signals into a plurality of processing blocks. Herein, each processing block of the plurality of processing blocks comprises a plurality of slots, wherein each slot of the plurality of slots comprising a plurality of data symbols, a reference signal symbol and a plurality of reference signal tones. For each processing block, the instructions further cause the at least one processor to estimate a time offset by determining a first correlation value between the plurality of the reference signal tones within one reference signal symbol and to estimate a frequency offset by determining a second correlation value between a plurality of reference signal symbols across the plurality of slots. Eventually, the instructions cause the at least one processor to perform channel estimation upon estimating the time offset and the frequency offset of all of the plurality of the processing blocks.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DRAWINGS

The novel features and characteristics of the disclosure are set forth in the appended claims. The disclosure itself, however, as well as a preferred mode of use, further objectives, and advantages thereof, will best be understood by reference to the following detailed description of an illustrative embodiment when read in conjunction with the accompanying figures. One or more embodiments are now described, by way of example only, with reference to the accompanying figures wherein like reference numerals represent like elements and in which:

Figure 3:
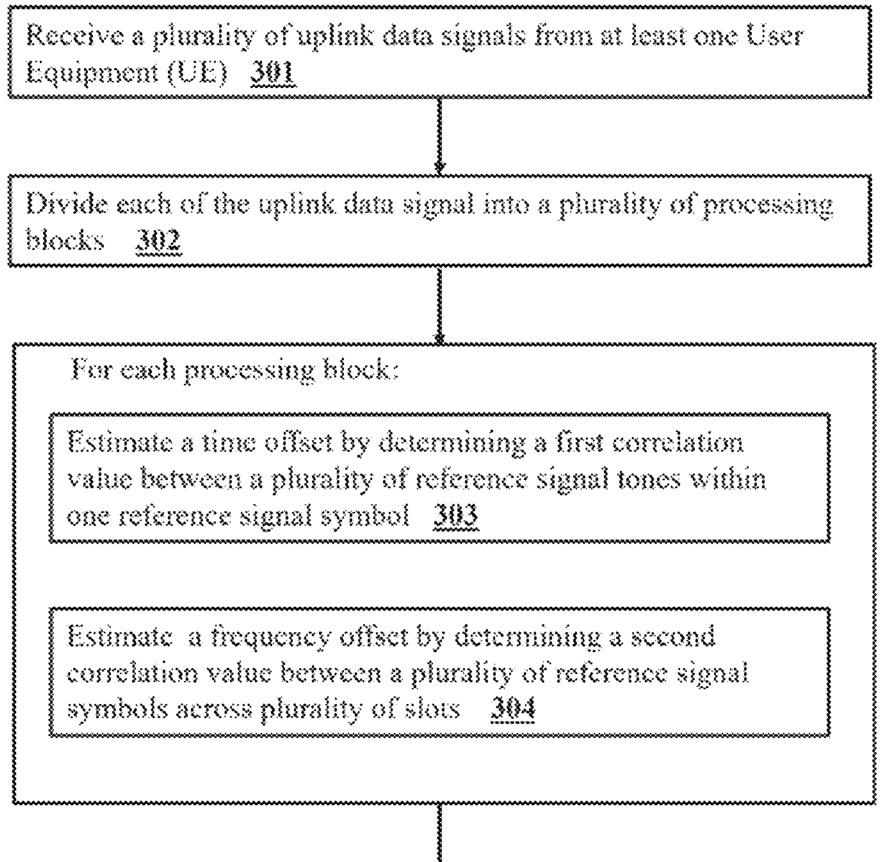
Figure 4:
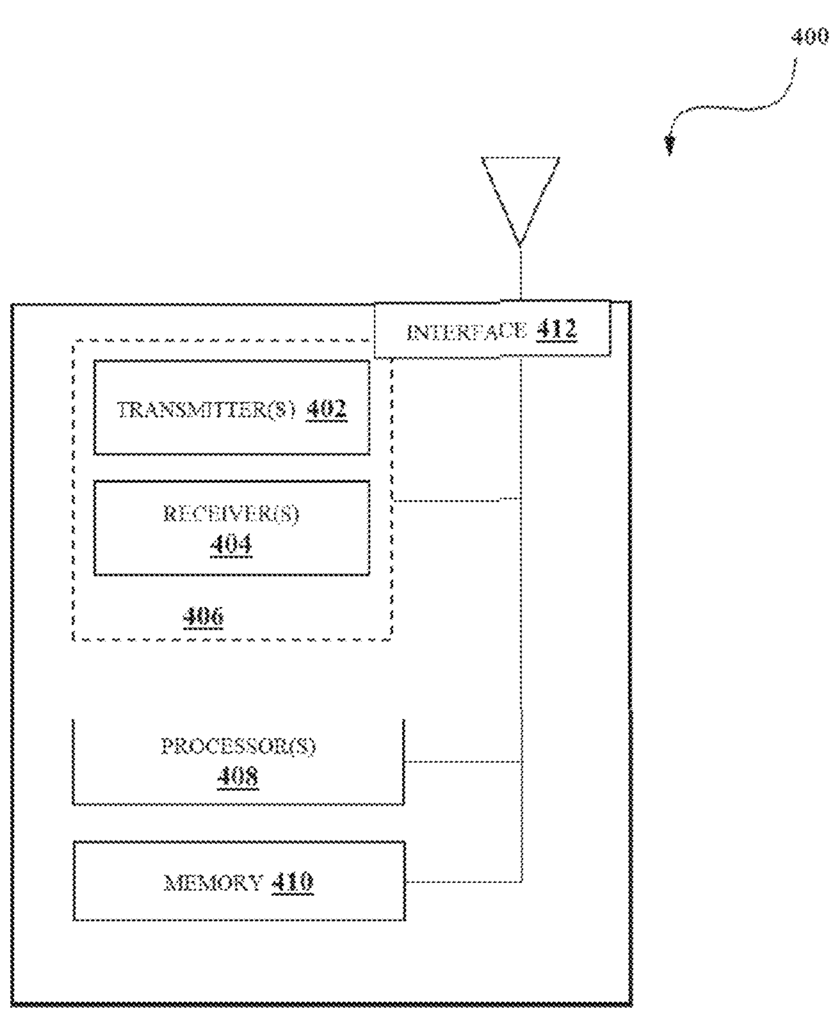

FIG. 3 shows an exemplary flow chart illustrating method steps for performing channel estimation for uplink data in the NB-IoT physical layer, in accordance with some embodiments of the present disclosure; and FIG. 4 illustrates a detailed block diagram of an apparatus where the signal processing in the NB-IoT physical layer technique may be implemented, in accordance with some embodiments of the present disclosure.

It should be appreciated by those skilled in the art that any block diagram herein represents conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternatives falling within the scope of the disclosure.

The terms "comprises", "comprising", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Channel estimation plays a crucial role in wireless communication systems, especially at a base station (BS). It is essential for achieving reliable communication with high data rates in NB-IoT applications. Herein, one or more of User Equipment (UEs) may send a plurality of uplink data signals via NPUSCH Format-1 carrying essential information for estimating a channel, which is processed at the BS. However, as stated earlier, in NB-IOT applications, there are scenarios wherein one or more sensors of the UE are placed at such location from where it is very difficult to detect the signals (Low Signal to Noise Ratio (SNR)). Such scenarios may include but not limited thereto, UE and/or sensors placed in basements, etc. This causes serious impact on the quality of received uplink data signals and thus on accurately performing channel estimation for the received uplink data signals.

Accordingly, the present disclosure provides a method and a system for performing channel estimation for uplink data in the NB-IoT physical layer. The method and system of the present disclosure provides block wise processing of the uplink data signals, wherein each uplink data signal is divided into a plurality of processing blocks. For each processing block, a time offset is estimated by determining a correlation value between a plurality of the reference signal tones within one reference signal symbol. Further, within the same processing block, after the estimation of time offset (TO), a frequency offset (FO) is also estimated. The FO is estimated by determining a correlation value between a plurality of reference signal symbols across plurality of slots of the processing block. Thereafter, the channel estimation is performed based on the time offset estimate and the frequency offset estimate of all of the plurality of the processing blocks. The steps of the channel estimation also require performing weighted moving average of FO estimates and TO estimates, respectively across each current processing block, at the base station by leveraging FO and TO estimates of a previous processing block. By considering the TO and FO estimates from the previous processing block, the accuracy of the TO and FO estimation for the current processing block is increased. Based on the accurate TO and FO estimates, the uplink data may be decoded correctly even at lower SNR levels.

Further, the method and the system of the present disclosure provides noise and interference estimation on reserved NPUSCH tones overlapping with a Narrowband Physical Random Access Channel (NPRACH) slot. This leads to accurate noise and interference estimation. With the accurate noise and interference estimation, Signal to Interference plus Noise Ratio (SINR) thresholds can be used for discontinuous transmission (DTX) detection and FO/TO estimation.

Figure 1A:
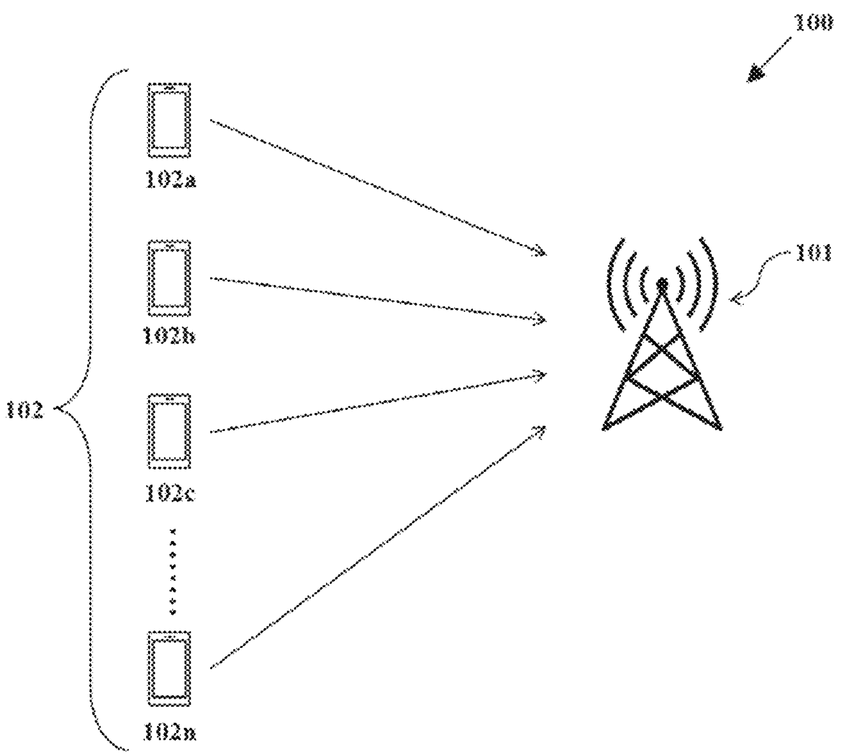
FIGS. 1A-1B illustrate an exemplary environment for performing channel estimation for uplink data in NB-IoT physical layer, in accordance with some embodiments of the present disclosure.
Figure 1B:
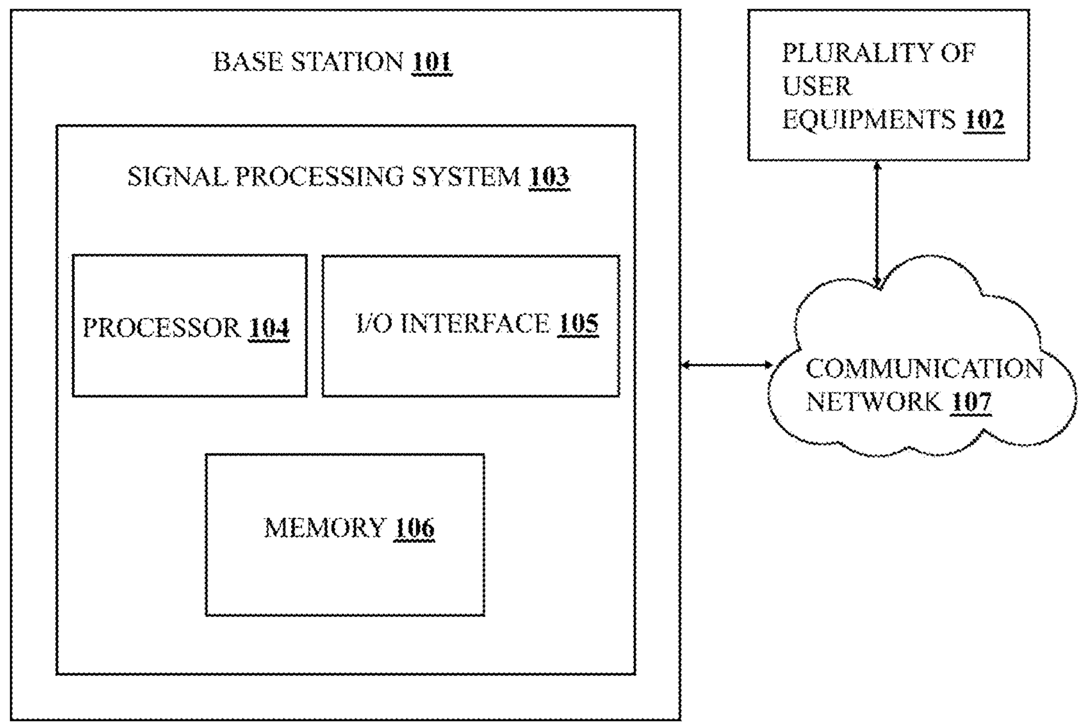

FIGS. 1A-1B illustrate an exemplary environment for performing channel estimation for uplink data in NB-IoT physical layer, in accordance with some embodiments of the present disclosure.

As shown in FIG. 1A, the exemplary environment 100 includes a Base Station (BS) 101 and a plurality of User Equipment (UEs) 102*a*, 102*b*, 102*c*, . . . , 102*n* (hereinafter collectively referred to as plurality of UEs 102). The plurality of UEs 102 may refer to the UEs attempting to send a plurality of uplink data signals to the BS 101 via a communication network 107. In one non-limiting example, each UE 102 of the plurality of UEs 102 is involved in one or more narrow band Internet of things (NB-IoT) applications. As a non-limiting example, the NB-IOT applications may include smart metering (such as electricity, gas, and water meter), smart buildings with intruder and fire alarms for residential and commercial properties, tracking people, animals, or objects, connected industrial appliances, etc. Each of the plurality of UEs may be, but not limited to a phone (e.g., a cellular phone or smart phone), a pager, a laptop computer, a desktop computer, a wireless handset, a portable communication device, a portable computing device (e.g., a personal data assistant), or any other suitable computing device including a wired or wireless communications interface. According to an embodiment of the present disclosure, the BS 101 is implemented as NB-IoT gNB. Herein, the BS 101 may be partitioned into one or more Central Unit (CU) entities, one or more Distributed Unit (DU) entities, and one or more Radio Units (RUs). Notably, the CU and the DU may be designed to run on or in a "cloud" environment based on traffic demand.

As shown in FIG. 1B, the BS 101 includes a signal processing system 103. The plurality of UEs 102 may send the plurality of uplink data signals utilizing a narrowband Physical Uplink Shared Channel (NPUSCH) format 1, to the signal processing system 103 of the BS 101. The NPUSCH format 1 is transmitted on one or more resource units and each of these resource units are repeated up several times to improve transmission reliability and coverage without compromising on the low power and low complexity requirements of NB-IoT applications. The signal processing system 103 may process the plurality of the uplink data signals in the NB-IoT physical layer. Notably, each of the plurality of the uplink data signals are transmitted from each of the plurality of UEs 102 to at least one antenna of the BS 101. When the BS 101 receives the uplink data signals, the signal processing system 103 may perform channel estimation for the uplink data signals and decode the uplink data signals to recover original uplink user data also known as transport block. It may be worth noting that, the BS 101 implements block wise processing of the plurality of the uplink data signals for channel estimation, and by considering estimates of Timing Offset (TO) and Frequency Offset (FO) from a previous processing block, accuracy of TO and FO estimation for a current processing block is improved. This allows the signal processing system 103 to correctly decode the uplink data signals even at lower SNR levels.

The signal processing system 103 may be implemented in a variety of computing systems, such as, a server, a cloud computing system, a network server, a cloud-based server, and the like. In an embodiment, the signal processing system 103 may be a dedicated server or may be a cloud-based server. The signal processing system 103 of the present disclosure is communicably coupled to the plurality of UEs 102. Further, the signal processing system 103 may include a processor 104, a I/O interface 105, and the memory 106. In some embodiments, the memory 106 may be communicatively coupled to the processor 104. The memory 106 stores instructions, executable by the processor 104, which, on execution, may cause the signal processing system 103 to process the uplink data signals, as disclosed in the present disclosure.

The signal processing system 103 may communicate with the plurality of UEs 102 via a communication network 107. In an embodiment, the communication network 107 may include, without limitation, a direct interconnection, Local Area Network (LAN), Wide Area Network (WAN), Controller Area Network (CAN), wireless network (e.g., using a Wireless Application Protocol), the Internet, and the like.

Figure 2:
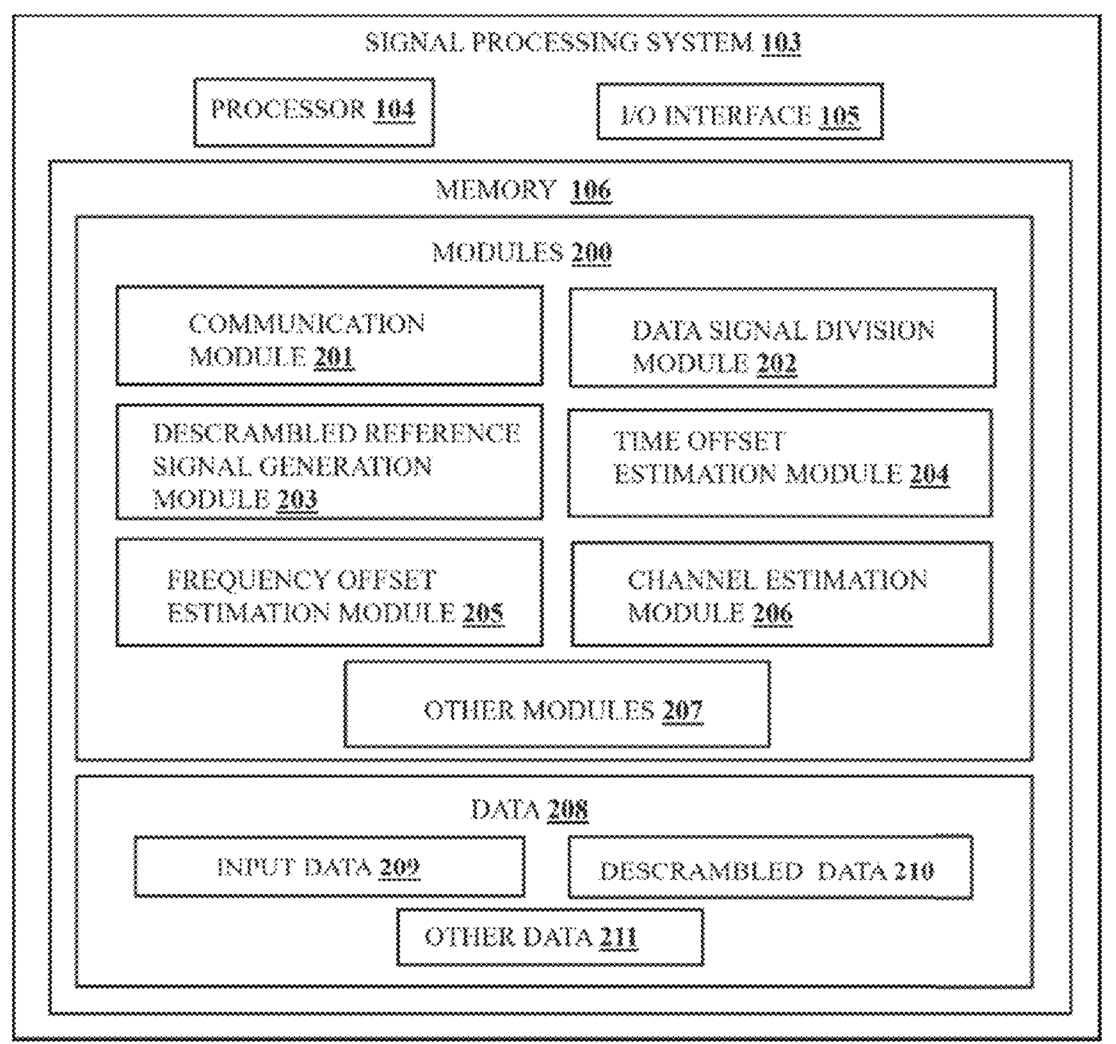
FIG. 2 illustrates a detailed diagram of a signal processing system of a base station shown in the FIGS. 1A-1B, in accordance with some embodiments of the present disclosure.

FIG. 2 illustrates a detailed diagram of a signal processing system 103, in accordance with some embodiments of the present disclosure.

Data 208 and one or more modules 200 in the memory 106 of the signal processing system 103 is described herein in detail. In an embodiment, the data 208 in the memory 106 may include input data 209, descrambled data 210, and other data 211 associated with the signal processing system 103.

The input data 209 may include data from the plurality of UEs 102. The input data 209 comprises the plurality of uplink data signals. Herein, the plurality of uplink data signals may include at least one of: of Hybrid Automatic Repeat Request (HARQ) feedback, Channel State Information (CSI) and Scheduling Request (SR).

The descrambled data 210 may include information regarding a plurality of descrambled reference signal symbols and tones for the plurality of UEs 102. It will be appreciated that descrambled data 210 comprises data for at least one narrowband demodulation reference signal (DM-RS), which is an original information-bearing signal extracted from a signal-carrying wave. The plurality of descrambled DM-RS symbols and tones are generated based on the function of the plurality of uplink data signals and a predetermined pseudorandom binary sequence (PRBS) associated with the BS 101. Precisely, the plurality of descrambled DM-RS symbols and tones are generated or obtained by removing the predetermined PRBS from the DM-RS symbols and tones, which is discussed later in coming paragraphs.

The other data 211 may store data, including temporary data and temporary files, generated by the above modules for performing the various functions of the signal processing system 103.

In an embodiment, the data 208 in the memory 106 may be processed by the one or more modules 200 of the signal processing system 103. The one or more modules 200 may be configured to perform the steps of the present disclosure using the data 208, for processing the uplink data signals. In an embodiment, each of the one or more modules 200 may be a hardware unit which may be outside the memory 106 and coupled with the signal processing system 103. In an embodiment, the one or more modules 200 may be implemented as dedicated units and when implemented in such a manner, said modules may be configured with the functionality defined in the present disclosure to result in a novel hardware. As used herein, the term module may refer to an Application Specific Integrated Circuit (ASIC), a processor, an electronic circuit, a Field-Programmable Gate Arrays (FPGA), Programmable System-on-Chip (PSoC), a combinational logic circuit, and/or other suitable components that provide the described functionality.

In one implementation, the one or more modules 200 may include, but are not limited to, a communication module 201, a data signal division module 202, a descrambled reference signal generation module 203, a time offset estimation module 204, a frequency offset estimation module 205, a channel estimation module 206 and other modules 207, associated with the signal processing system 103.

One or more modules 200 of the signal processing system 103 function to process the uplink data signals, based on the data 208. The one or more modules 200 along with the data 208, may be implemented in any system, for processing the uplink data signals.

The communication module 201 may receive the plurality of uplink data signals from the plurality of UEs 102. It will be appreciated that the communication module 201 is utilized for receiving data pertaining to the signal processing system 103.

Data signal division module 202 may divide the uplink data signal into a plurality of processing blocks to reduce processing burden. In one embodiment, each processing block of the plurality of processing blocks contains at least two resource units. Each resource unit includes at least two resource blocks, and each resource block includes a time slot. Each time slot comprising a plurality of data symbols, a DM-RS symbol and a plurality of DM-RS tones. As per NPUSCH format 1, each time slot will have seven symbols in total, and middle symbol as DM-RS which is used for channel estimation. Though, in this embodiment, each processing block is shown to have at least two resource units, a person of ordinary skill will appreciate that the processing block may contain any suitable number of the resource units depending upon the implementation requirements of the present disclosure.

For each processing block, the descrambled reference signal generation module 203 may obtain a plurality of descrambled reference signal symbols by removing a predetermined PRBS from the reference signal symbols, which is referred herein as 'deprbs'. Herein, in a preferable example, but not limited thereto, deprbs symbols are achieved by conjugate multiplication of predetermined PRBS with each DM-RS symbol present within the processing block. Similarly, the descrambled reference signal generation module 203 may obtain a plurality of descrambled reference signal tones (deprbs tones) by removing the predetermined PRBS from the reference signal tones. Herein, in a preferable example, but not limited thereto, the deprbs tones are achieved by conjugate multiplication of the predetermined PRBS with each reference signal tone present within the processing block. Thereafter, the descrambled reference signal generation module 203 may provide the plurality of deprbs symbols and the plurality of deprbs tones for estimating the TO and the FO, respectively.

Moving forward, for each processing block, the time offset estimation module 204 may estimate a time offset (TO) by determining a first correlation value between the plurality of the deprbs tones within one reference signal symbol. Herein, the time offset estimation module 204 may calculate a phase of the first correlation value that provides the TO estimate for a current processing block. The phase may refer to the phase or direction followed by the uplink data signal to reach the BS 101.

Further, the frequency offset estimation module 205 may estimate a frequency offset (FO) by determining a second correlation value between a plurality of the deprbs symbols across the plurality of the time slots. Herein, the frequency offset estimation module 205 may calculate a phase of the second correlation value that provides the FO estimate for the current processing block.

In one non-limiting embodiment, to estimate the TO of a current processing block, the time offset estimation module 204 may determine if current processing block is a first processing block. Once, it is determined that the processing block is a first processing block, the time offset estimation module 204 may obtain the TO estimate of the first processing block. In one non-limiting example, the time offset estimation module 204 may obtain the TO estimate of the first processing block by utilizing data stored in a previous data transfer session with the same UE. In this example, the TO estimate is indicative of a TO value of a last processing block of the data stored in the previous data transfer session of the same least one UE. In another non-limiting example, if the UE do not have any previous data transfer sessions with the BS 101, the time offset estimation module 204 may obtain the TO estimate of the first/current processing block by determining the first correlation value between the plurality of the deprbs tones within one DM-RS symbol. Further, the time offset estimation module 204 may determine noise power feedback from a plurality of reserved tones of the uplink data signals. In one non-limiting example, the noise power feedback is obtained from a Signal to noise ratio (SNR). In general, SNR is calculated by taking a ratio of average signal power per resource unit per receive antenna and average noise power per resource unit per receive antenna.

Further, the time offset estimation module 204 may apply a time offset compensation over the plurality of the deprbs tones, based on the noise power feedback and the time offset estimate. In one aspect, the time offset estimation module 204 may compare the SNR with a pre-defined TO threshold. If SNR is greater than the pre-defined TO threshold, the time offset estimation module 204 may apply a time offset (TO) compensation over the plurality of the deprbs tones. If SNR is less than the pre-defined TO threshold, the time offset estimation module 204 may apply configurable CP samples for the TO compensation. Additionally, the time offset estimation module 204 may obtain an average of the plurality of the deprbs tones for the FO estimation.

In one non-limiting embodiment, to estimate the TO the time offset estimation module 204 may determine if the current processing block is not a first processing block. In this case, let's assume that the current processing block is a second processing block. Once, it is determined that the current processing block is the second processing block, the time offset estimation module 204 may obtain an instantaneous time offset estimate of the second processing block. Herein, the instantaneous time offset estimate of second processing block is calculated based on the first correlation value between the plurality of the deprbs tones within the one DM-RS symbol. Further, the time offset estimation module 204 may obtain the TO estimate of the second processing block by utilizing a time offset estimate of a previous processing block. Since, in this example, the current processing block is the second processing block, the first processing block is considered as the previous processing block. Notably, the time offset estimation module 204 may obtain the TO estimate of the second processing block by determining a weighted moving average between the instantaneous time offset estimate of the current processing block and the time offset estimate of the first processing block. Herein, the weighted moving average between the instantaneous time offset estimate of the current processing block and the time offset estimate of the first processing block is calculated as follows:

$$\text{phaseInc}=(1-\text{phaseWeight})*\text{phaseAvg}+\text{phaseWeight}*\text{phaseIns} \quad \text{Equation 1}$$

wherein:

phaseInc indicates phase estimated for current processing block by considering block phase estimate of the earlier or previous processing block and instantaneous phase estimate of the current processing block, phaseWeight=1/blockIndex, wherein, phaseWeight indicates weightage for instantaneous estimates and blockIndex={1, 2, . . . }represents a serial number or sequence of current processing block, phaseIns indicates instantaneous phase estimated for a block, phaseAvg=phaseInc, at the end of current block processing the average value of current block is updated.

It may be appreciated that, for each current processing block that is not the first processing block, the time offset estimation module 204 may obtain the TO estimate of said current processing block, in a manner as calculated in Equation 1.

Further, the time offset estimation module 204 may determine the noise power feedback from one or more reserved tones of the plurality of uplink data signals. Moving ahead, the time offset estimation module 204 may apply a time offset compensation over the plurality of the deprbs tones, based on the noise power feedback and the time offset estimate. For example, the time offset estimation module 204 may compare the SNR with the pre-defined TO threshold. If SNR is greater than the pre-defined TO threshold, the time offset estimation module 204 may apply a time offset compensation (TO) over the plurality of the deprbs tones. If SNR is less than the pre-defined TO threshold, the time offset estimation module 204 may apply configurable CP samples for the TO compensation. Additionally, average of the plurality of the deprbs tones obtained from the TO compensation will be used for the FO estimation.

In another embodiment, to estimate the FO, the frequency offset estimation module 205 may determine if the current processing block is a first processing block. Once, it is determined that the processing block is a first processing block, the frequency offset estimation module 205 may obtain the FO estimate of the first processing block. In one non-limiting example, the frequency offset estimation module 205 may obtain the FO estimate of the first processing block by utilizing data stored in a previous data transfer session with the same UE. In this example, the FO estimate is indicative of a frequency offset value of a last processing block of the data stored in the previous data transfer session of the same least one UE. In another non-limiting example, if the UE do not have any previous data transfer sessions with the BS 101, the frequency offset estimation module 205 may obtain the FO estimate of the first/current processing block by determining the second correlation value between the plurality of the deprbs symbols in each of the plurality of time slots. Further, the frequency offset estimation module 205 may determine noise power feedback from a plurality of reserved tones of the uplink data signals. As previously indicated, in one non-limiting example, the noise power feedback is obtained from a Signal to noise ratio (SNR). In general, SNR is calculated by taking a ratio of average signal power per resource unit per receive antenna and average noise power per RE per receive antenna.

Further, the frequency offset estimation module 205 may apply a frequency offset compensation over the plurality of the deprbs tones, based on the noise power feedback and the frequency offset estimate. In one aspect, the frequency offset estimation module 205 may compare the SNR with a pre-defined FO threshold. If SNR is greater than the pre-defined FO threshold, the frequency offset estimation module 205 may apply FO compensation over the plurality of the deprbs tones and may also obtain a phase increment estimate per DM-RS symbol. If SNR is less than the pre-defined FO threshold, the frequency offset estimation module 205 may obtain an average of the plurality of the deprbs symbols to get one-tap channel estimates.

In one non-limiting embodiment, to estimate the FO, the frequency offset estimation module 205 may determine if the current processing block is not the first processing block. In this case, let's assume that the current processing block is a second processing block. Once, it is determined that the current processing block is the second processing block, the frequency offset estimation module 205 may obtain an instantaneous frequency offset estimate of the second processing block. Herein, the instantaneous FO estimate of second processing block is calculated based on the second correlation value between the plurality of the deprbs symbols in each slot of the plurality of time slots. Further, the frequency offset estimation module 205 may obtain the FO estimate of the second processing block by utilizing a FO estimate of the previous processing block. Herein, the current processing block is the second processing block, and the first processing block is the previous processing block. Notably, the frequency offset estimation module 205 may obtain the FO estimate of the second processing block by determining a weighted moving average between the instantaneous FO estimate of the current processing block and the FO estimate of the first processing block. Herein, the weighted moving average between the instantaneous FO estimate of the current processing block and the FO estimate of the first processing block is calculated as based on Equation 1.

It may be appreciated that, for each current processing block that is not the first processing block, the frequency offset estimation module 205 may obtain the FO estimate of said current processing block, in a manner as calculated in Equation 1.

Further, the frequency offset estimation module 205 may determine the noise power feedback from one or more reserved tones of the plurality of uplink data signals. Moving ahead, the frequency offset estimation module 205 may apply FO compensation over the plurality of the deprbs tones, based on the noise power feedback and the FO estimate. For example, the frequency offset estimation module 205 may compare the SNR with the pre-defined TO threshold. If SNR is greater than the pre-defined TO threshold, the time offset estimation module 204 may apply a time offset compensation over the plurality of the deprbs tones. In one aspect, the frequency offset estimation module 205 may compare the SNR with a pre-defined FO threshold. If SNR is greater than the pre-defined FO threshold, the frequency offset estimation module 205 may apply the FO compensation over the plurality of the deprbs tones and may also obtain a phase increment estimate per DM-RS symbol. In another aspect, if SNR is less than the pre-defined FO threshold, the frequency offset estimation module 205 may obtain an average of the plurality of the deprbs symbols to get the one-tap channel estimates.

It is worth noting that in the present disclosure, the TO estimation is performed prior to the FO estimation. This significantly reduces processing cycle or computation process for decoding the uplink data signal.

Eventually, the channel estimation module 206 may perform the channel estimation upon estimating the TO and the FO of all of the plurality of the processing blocks.

The modules 200 may also include other modules 207 such as a Signal to Noise Ratio (SNR) estimation module 207A (not explicitly shown in fig.) and a decoding module 207B (not explicitly shown in fig.) that perform various miscellaneous functionalities of the signal processing system 103. Herein, the SNR estimation module 207A may estimate SNR for each current processing block. In one non-limiting embodiment, the SNR estimation module 207A may determine a plurality of Signal-to-interference-plus-noise ratio (SINR) estimates based on a signal power computed from the DM-RS symbols and a plurality of the noise variance estimates obtained from the reserved tones of the plurality of uplink data signals. If there is no interference from the neighbouring cells, the plurality of noise variance estimates can be calculated based on the one-tap channel estimates obtained from the channel estimation module 206.

The SNR estimation module 207A may compare each SINR estimate of the plurality of SINR estimates with a predetermined DTX threshold. In one aspect, if the SINR estimate is less than the predetermined DTX threshold, the SNR estimation module 207A may detect a discontinuous transmission from at least one UE. Based on this, the SNR estimation module 207A may send a request to at least one UE to retransmit the plurality of uplink data signals. In another aspect, if each of the SINR estimates is greater than a predetermined threshold, the SNR estimation module 207A may determine that a transmission that includes the plurality of uplink data signals from at least one UE is not a discontinuous transmission. Notably, if it is determined that the transmission from at least one UE is not a discontinuous transmission, the decoding module 207B may perform decoding over the plurality of uplink data signals to recover the original transport blocks or uplink user data.

In one embodiment, the phase increment estimate per DM-RS symbol obtained by the frequency offset estimation module 205 are utilized for data equalization. In one non-limiting example, the present disclosure may utilize Minimum Mean Square Equalization (MMSE) to extract resource elements of the NPUSCH. Data equalization is followed by Inverse Discrete Fourier Transform (IDFT) and demodulation and decoding to recover the original transport blocks or uplink user data from the received plurality of uplink data signals. It may be noted that the data equalization, the IDFT, the demodulation and the decoding may be performed by utilizing any available techniques that serves the implementation requirements of the present disclosure.

In various conditions where the UEs are located in deep coverage regions, uplink block error rate is less than 10%. It may be appreciated that by the way of present disclosure, DTX detection is performed considering the SINR estimates, the accuracy of DTX detection is also increased which helps Layer 2 scheduler to optimize uplink resources.

FIG. 3 shows an exemplary flow chart illustrating method steps for performing channel estimation for uplink data in NB-IoT physical layer, in accordance with some embodiments of the present disclosure.

As illustrated in FIG. 3, method 300 may comprise one or more steps. The method 300 may be described in the general context of computer executable instructions. Generally, computer executable instructions can include routines, programs, objects, components, data structures, procedures, modules, and functions, which perform particular functions or implement particular abstract data types.

The order in which method 300 is described is not intended to be construed as a limitation, and any number of the described method blocks can be combined in any order to implement the method. Additionally, individual blocks may be deleted from the methods without departing from the scope of the subject matter described herein. Furthermore, the method can be implemented in any suitable hardware, software, firmware, or combination thereof.

At step 301, the signal processing system 103 may receive a plurality of uplink data signals from at least one User Equipment (UE). It will be appreciated that method 300 is performed for narrowband Physical Uplink Shared Channel (NPUSCH) format 1.

At step 302, the signal processing system 103 may divide each of the uplink data signals into a plurality of processing blocks. Herein, each processing block of the plurality of processing blocks comprises a plurality of slots, wherein each slot of the plurality of slots comprises a plurality of data symbols, a reference signal symbol and a plurality of reference signal tones.

At step 303, for each processing block, the signal processing system 103 may estimate a time offset by determining a first correlation value between the plurality of the reference signal tones within one reference signal symbol. Herein, precisely, the time offset is determined based on calculation of a phase of the first correlation value.

At step 304, for each processing block, the signal processing system 103 may estimate a frequency offset by determining a second correlation value between a plurality of reference signal symbols across the plurality of slots. Herein, precisely, the frequency offset is determined based on calculation of a phase of the second correlation value.

At step 305, the signal processing system 103 may perform channel estimation upon estimating the time offset and the frequency offset of all of the plurality of the processing blocks.

Herein, in one embodiment, for the steps 303 and 304, the signal processing system 103 may perform a weighted moving average of FO estimates and TO estimates, respectively across each current processing block, based on a FO and TO estimates of a previous processing block. A detailed description of the FO and TO estimates is provided in paragraphs with respect to FIG. 2. Repetition of the same is avoided for sake of brevity.

As also noted from previous paragraphs of the present disclosure, by considering the estimates of TO and FO from the previous processing block, the accuracy of the TO and FO estimation for the current processing block increases, and it helps to correctly decode the uplink data at lower SNR levels.

Further, in one embodiment, the SNR estimation module 207A may determine a plurality of Signal-to-interference-plus-noise ratio (SINR) estimates to detect a discontinuous transmission (DTX). As stated earlier, since the discontinuous transmission (DTX) is performed considering the SINR estimates, the accuracy of DTX detection is also increased which helps Layer 2 scheduler to optimize uplink resources. A detailed description of SINR estimate determination and DTX detection is provided in paragraphs with respect to FIG. 2. Repetition of the same is avoided for sake of brevity.

In various conditions where the UEs are located in deep coverage regions, uplink block error rate is less than 10%. It may be appreciated that by the way of present disclosure, DTX detection is performed considering the SINR estimates, the accuracy of DTX detection is also increased which helps Layer 2 scheduler to optimize uplink resources.

Referring now to FIG. 4 which illustrates a detailed block diagram of an apparatus, in accordance with some embodiments of the present disclosure. It will be appreciated that the apparatus 400 is associated with the BS 101. The apparatus 400 may comprise at least one transmitter 402, at least one receiver 404, at least one processor 408, at least one memory 410, at least one interface 412, and at least one antenna 414. The at least one transmitter 402 may be configured to transmit data/information to one or more nodes/devices using the antenna 414 and the at least one receiver 404 may be configured to receive data/information from the one or more nodes/devices using the antenna 414. The at least one transmitter 402 and receiver 404 may be collectively implemented as a single transceiver module 406. In one non-limiting embodiment, the at least one processor 408 may be communicatively coupled with the transceiver 406, memory 410, interface 412, and antenna 414 for implementing the above-described technique of processing the uplink data signals.

The at least one processor 408 may include, but not restricted to, microprocessors, microcomputers, micro-controllers, central processing units, state machines, logic circuitries, and/or any devices that manipulate signals based on operational instructions. A processor may also be implemented as a combination of computing devices, e.g., a combination of a plurality of microprocessors or any other such configuration. The at least one memory 410 may be communicatively coupled to the at least one processor 408 and may comprise various instructions, the UE signal strength data, the initial bandwidth part, the one or more dedicated bandwidth parts, the pre-defined intervals, and the like. The at least one memory 410 may include a Random-Access Memory (RAM) unit and/or a non-volatile memory unit such as a Read Only Memory (ROM), optical disc drive, magnetic disc drive, flash memory, Electrically Erasable Read Only Memory (EEPROM), a memory space on a server or cloud and so forth. The at least one processor 408 may be configured to execute one or more instructions stored in the memory 410.

The interfaces 412 may include a variety of software and hardware interfaces, for example, a web interface, a graphical user interface, an Input Device-Output Device (I/O) interface, a network interface, and the like. The I/O interfaces may allow the apparatus 400 to communicate with one or more nodes/devices either directly or through other devices. The network interface may allow the apparatus 400 to interact with one or more networks either directly or via any other network. In one non-limiting embodiment, the apparatus 400 may be a part of the BS 101, but not limited thereto.

In a non-limiting embodiment of the present disclosure, one or more non-transitory computer-readable media may be utilized for implementing the embodiments consistent with the present disclosure. A computer-readable media refers to any type of physical memory (such as the memory 410) on which information or data readable by a processor may be stored. Thus, a computer-readable media may store one or more instructions for execution by the at least one processor 408, including instructions for causing the at least one processor 408 to perform steps or stages consistent with the embodiments described herein. The term "computer-readable media" should be understood to include tangible items and exclude carrier waves and transient signals. By way of example, and not limitation, such computer-readable media can comprise Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Thus, certain aspects may comprise a computer program product for performing the operations presented herein. For example, such a computer program product may comprise a computer readable media having instructions stored (and/or encoded) thereon, the instructions being executable by one or more processors to perform the operations described herein.

The various illustrative logical blocks, modules, and operations described in connection with the present disclosure may be implemented or performed with a general-purpose processor, discrete gate or transistor logic, discrete hardware components or any combination thereof designed to perform the functions described herein. A general-purpose processor may include a microprocessor, but in the alternative, the processor may include any commercially available processor, controller, microcontroller, or state machine. A processor may also be implemented as a combination of computing devices, e.g., a plurality of microprocessors, or any other such configuration.

The terms "an embodiment", "embodiment", "embodiments", "the embodiment", "the embodiments", "one or more embodiments", "some embodiments", and "one embodiment" mean "one or more (but not all) embodiments of the present disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary a variety of optional components are described to illustrate the wide variety of possible embodiments of the present disclosure.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article, or a different number of devices/articles may be used instead of the shown number of devices or programs. The functionality and/or the features of a device may be alternatively embodied by one or more other devices which are not explicitly described as having such functionality/features. Thus, other embodiments of the present disclosure need not include the device itself.

The illustrated operations of FIG. 3 show certain events occurring in a certain order. In alternative embodiments, certain operations may be performed in a different order, modified, or removed. Moreover, steps may be added to the above-described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the present disclosure be limited not by this detailed description, but rather by any claims that issue on an application based here on. Accordingly, the disclosure of the embodiments of the present disclosure is intended to be illustrative, but not limiting, of the scope of the present disclosure, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

REFERRAL NUMERALS

| Referral number | Description |
|---|---|
| **100** | Exemplary environment |
| **101** | Base Station |
| **102** | Plurality of user equipment |
| **103** | Signal processing system |
| **104** | Processor |
| **105** | I/O interface |
| **106** | Memory |
| **107** | Communication Network |
| **200** | Modules |
| **201** | Communication Module |
| **202** | Data signal division module |
| **203** | Descrambled reference signal generation module |
| **204** | Time offset estimation module |
| **205** | Frequency offset estimation module |
| **206** | Channel estimation module |
| **207** | Other modules |
| **208** | Data |
| **209** | Input data |
| **210** | Descrambled data |
| **211** | Other data |
| **300** | Method |
| **301-305** | Method steps |
| **402** | Transmitter |
| **404** | Receiver |
| **406** | Transceiver module |
| **408** | Processor |
| **410** | Memory |
| **412** | Interface |

The invention claimed is:

1. A method comprising:

receiving, a plurality of uplink data signals from at least one User Equipment (UE);

dividing each of the uplink data signals into a plurality of processing blocks, each processing block of the plurality of processing blocks comprises a plurality of slots, wherein each slot of the plurality of slots comprising a plurality of data symbols, a reference signal symbol and a plurality of reference signal tones;

for each processing block:

estimating a time offset by determining a first correlation value between the plurality of reference signal tones within one reference signal symbol; and estimating a frequency offset by determining a second correlation value between a plurality of reference signal symbols across the plurality of slots; and performing channel estimation upon estimating the time offset and the frequency offset of all of the plurality of the processing blocks.

2. The method as claimed in claim 1, wherein the method is performed for a narrowband Physical Uplink Shared Channel (NPUSCH) format 1.

3. The method as claimed in claim 1, further comprising:

obtaining a plurality of descrambled reference signal symbols by removing a predetermined pseudorandom binary sequence (PRBS) from the reference signal symbols;

obtaining a plurality of descrambled reference signal tones by removing the predetermined PRBS from the reference signal tones;

providing the plurality of descrambled reference signal symbols and the plurality of descrambled reference signal tones for estimating the time offset and frequency offset, respectively.

4. The method as claimed in claim 1, wherein estimating the time offset, further comprising:

determining if the processing block is a first processing block;

in response to the determination that the processing block is the first processing block:

obtaining the time offset estimate of current block based on data stored in a previous data transfer session with the same at least one UE, wherein the time offset estimate is indicative of a time offset value of a last processing block of the data stored in the previous data transfer session with the same at least one UE;

determining a noise power feedback from a plurality of reserved tones of the uplink data signals;

applying a time offset compensation over the plurality of the reference signal tones, based on the noise power feedback and the time offset estimate; and in response to the determination that the processing block is not the first processing block:

obtaining an instantaneous time offset estimate of current processing block based on the first correlation value between the plurality of the reference signal tones within the one reference signal symbol;

estimating the time offset of the current processing block by:

determining a weighted moving average between the instantaneous time offset estimate of the current processing block and the time offset estimate of a previous processing block;

determining the noise power feedback from reserved tones of the uplink data signals; and applying a time offset compensation over the plurality of the reference signal tones, based on the time offset and the noise power feedback.

5. The method as claimed in claim 1, wherein estimating the frequency offset, further comprising:

determining if the processing block is a first processing block;

obtain a frequency offset estimate of current block based on data stored in a previous data transfer session with the same at least one UE, wherein the frequency offset estimate is indicative of a frequency offset value of a last processing block of the data stored in the previous data transfer session with the same at least one UE;

determining a noise power feedback from the reserved tones of the uplink data signals;

applying a time offset compensation over the plurality of the reference signal tones, based on the time offset estimate and the noise power feedback;

in response to the determination that the current processing block is not a first processing block:

obtaining an instantaneous frequency offset estimate of the current processing block based on the second correlation value between the plurality of the reference symbols in each slot of the plurality of slots;

estimating the frequency offset of the current processing block by:

determining a weighted moving average of the instantaneous frequency offset estimate of the current processing block and the frequency offset estimate of a previous processing block;

determining the noise power feedback from reserved tones of the uplink data signals;

applying a frequency offset compensation over the plurality of the reference signal tones, based on the frequency offset estimate and the noise power feedback.

6. The method as claimed in claim 1, further comprising:

determining a plurality of Signal-to-interference-plus-noise ratio (SINR) estimates based on a signal power computed from the reference signal symbols and a plurality of noise estimates obtained from a plurality of reserved tones of the uplink data signals;

comparing each SINR estimate of the plurality of SINR estimates with a predetermined threshold indicative of a discontinuous transmission;

if each SINR estimate is less than the predetermined threshold:

detecting a discontinuous transmission from the at least one UE; and sending a request to the at least one UE to retransmit the plurality of uplink data signals; and if each SINR estimate is greater than a predetermined threshold:

determining based on the comparison that a transmission from the at least one UE is not a discontinuous transmission; and performing decoding of the plurality of uplink data signals.

7. An apparatus comprising:

a processor; and a memory communicatively coupled to the processor, wherein the memory stores processor-executable instructions, which on execution, cause the processor to:

receive a plurality of uplink data signals from at least one User Equipment (UE);

divide the uplink data signal into a plurality of processing blocks, each processing block of the plurality of processing blocks comprises a plurality of slots, wherein each slot of the plurality of slots comprising a plurality of data symbols, a reference signal symbol and a plurality of reference signal tones;

for each processing block:

estimate a time offset by determining a first correlation value between the plurality of the reference signal tones within one reference signal symbol; and estimate a frequency offset by determining a second correlation value between a plurality of the reference symbols across the plurality of slots; and perform channel estimation upon estimating the time offset and the frequency offset of all of the plurality of the processing blocks.

8. The apparatus as claimed in claim 7, wherein the apparatus is implemented for a narrowband Physical Uplink Shared Channel (NPUSCH) format 1.

9. The apparatus as claimed in claim 7, wherein the processor is further configured to:

obtain a plurality of descrambled reference signal symbols by removing a predetermined pseudorandom binary sequence (PRBS) from the reference signal symbols;

obtain a plurality of descrambled reference signal tones by removing the predetermined PRBS from the reference signal tones; and provide the plurality of descrambled reference signal symbol and the plurality of descrambled reference signal tones for estimating the time offset and frequency offset, respectively.

10. The apparatus as claimed in claim 7, wherein to estimate the time offset, the processor is further configured to:

determine if the processing block is a first processing block;

in response to the determination that the processing block is a first processing block:

obtain the time offset estimate of current block based on data stored in a previous data transfer session with the same least one UE, wherein the time offset estimate is indicative of a time offset value of a last processing block of the data stored in the previous data transfer session of the same least one UE;

determine a noise power feedback from a plurality of reserved tones of the uplink data signals;

apply a time offset compensation over the plurality of the reference signal tones, based on the noise power feedback and the time offset estimate; and in response to the determination that the processing block is not the first processing block:

obtain an instantaneous time offset estimate of current processing block based on the first correlation value between the plurality of the reference signal tones within the one reference signal symbol;

estimate the time offset of the current processing block by:

determining a weighted moving average between the instantaneous time offset estimate of the current processing block and the time offset estimate of a previous processing block;

determining the noise power feedback from the plurality of reserved tones of the uplink data signals;

applying a time offset compensation over the plurality of the reference signal tones, based on the time offset and the noise power feedback.

11. The apparatus as claimed in claim 7, wherein to estimate the frequency offset, the processor is further configured to:

determine if the processing block is a first processing block;

in response to the determination that the current processing block is the first processing block:

obtain a frequency offset estimate of current block based on data stored in a previous data transfer session with the same at least one UE, wherein the frequency offset estimate is indicative of a frequency offset value of a last processing block of the data stored in the previous data transfer session with the same least one UE;

determine a noise power feedback from a plurality of reserved tones of the uplink data signals; and applying a time offset compensation over the plurality of the reference signal tones, based on the time offset estimate and the noise power feedback; and in response to the determination that the current processing block is not a first processing block:

obtain an instantaneous frequency offset estimate of the current processing block based on the second correlation value between the plurality of the reference symbols in each slot of the plurality of slots;

estimate the frequency offset of the current processing block by:

determining a weighted moving average of the instantaneous frequency offset estimate of the current processing block and the frequency offset estimate of a previous processing block;

determining the noise power feedback from the plurality of reserved tones of the uplink data signals;

applying a frequency offset compensation over the plurality of the reference signal tones, based on the frequency offset estimate and the noise power feedback.

12. The apparatus as claimed in claim 7, wherein the processor is further configured to:

determine a plurality of Signal-to-interference-plus-noise ratio (SINR) estimates based on a signal power computed from the reference signal symbols and a plurality of noise estimates obtained from a plurality of reserved tones of the uplink data signals.

13. The apparatus as claimed in claim 12, wherein the processor is further configured to:

compare each SINR estimate of the plurality of SINR estimates with a predetermined threshold indicative of a discontinuous transmission;

if each SINR estimate is less than the predetermined threshold:

detect a discontinuous transmission from the at least one UE; and send a request to the at least one UE to retransmit the plurality of uplink data signals; and if each SINR estimate is greater than a predetermined threshold:

determine based on the comparison that a transmission from the at least one UE is not a discontinuous transmission; and perform decoding of the plurality of uplink data signals.

14. A non-transitory computer readable medium including instructions stored thereon that when processed by at least one processor, cause the at least one processor to perform operations comprising:

receiving, a plurality of uplink data signals from at least one User Equipment (UE);

dividing the uplink data signal into a plurality of processing blocks, each processing block of the plurality of processing blocks comprises a plurality of slots, wherein each slot of the plurality of slots comprising a plurality of data symbols, a reference signal symbol and a plurality of reference signal tones;

for each processing block:

estimating a time offset by determining a first correlation value between a plurality of the reference signal tones within one reference signal symbol; and estimating a frequency offset by determining a second correlation value between a plurality of the reference symbols across the plurality of slots; and performing channel estimation upon estimating the time offset and the frequency offset of all of the plurality of the processing blocks.

15. The medium as claimed in claim 14, wherein the non-transitory computer readable medium is implemented for a narrowband Physical Uplink Shared Channel (NPUSCH) format 1.

16. The medium as claimed in claim 14, further comprising the instructions that when processed by the at least one processor, cause the at least one processor to perform operations comprising:

obtaining a plurality of descrambled reference signal symbols by removing a predetermined pseudorandom binary sequence (PRBS) from the reference signal symbols;

obtaining a plurality of descrambled reference signal tones by removing the predetermined PRBS from the reference signal tones; and providing the plurality of descrambled reference signal and the plurality of descrambled reference signal tones for estimating the time offset and frequency offset.

17. The medium as claimed in claim 14, further comprising the instructions that when processed by the at least one processor, cause the at least one processor to estimate the time offset, by:

determining if the processing block is a first processing block;

in response to the determination that the current processing block is a first processing block:

obtaining the time offset estimate of current block based on data stored in a previous data transfer session with the same least one UE, wherein the time offset estimate is indicative of a time offset value of a last processing block of the data stored in the previous data transfer session with the same least one UE;

determining a noise power feedback from a plurality of reserved tones of the uplink data signals;

applying a time offset compensation over the plurality of the reference signal tones, based on the noise power feedback and the time offset estimate; and in response to the determination that the processing block is not the first processing block:

obtaining an instantaneous time offset estimate of current processing block based on the first correlation value between the plurality of the reference signal tones within the one reference signal symbol;

estimating the time offset of the current processing block by:

determining a weighted moving average between the instantaneous time offset estimate of the current processing block and the time offset estimate of a previous processing block;

determining the noise power feedback from the plurality of reserved tones of the uplink data signals;

applying a time offset compensation over the plurality of the reference signal tones, based on the time offset and the noise power feedback.

18. The medium as claimed in claim 14, further comprising the instructions that when processed by the at least one processor, cause the at least one processor to estimate the frequency offset by:

determining if the processing block is a first processing block;

obtaining a frequency offset estimate of current block based on data stored in the previous data transfer session with the same at least one UE, wherein the frequency offset estimate is indicative of a frequency offset value of a last processing block of the data stored in the previous data transfer session with the same at least one UE;

determining a noise power feedback from a plurality of reserved tones of the uplink data signals;

applying a time offset compensation over the plurality of the reference signal tones, based on the time offset estimate and the noise power feedback;

in response to the determination that the current processing block is not a first processing block:

obtaining an instantaneous frequency offset estimate of the current processing block based on the second correlation value between the plurality of the reference symbols in each slot of the plurality of slots;

estimating the frequency offset of the current processing block by:

determining a weighted moving average of the instantaneous frequency offset estimate of the current processing block and the frequency offset estimate of a previous processing block;

determining the noise power feedback from reserved tones of the uplink data signals;

applying a frequency offset compensation over the plurality of the reference signal tones, based on the frequency offset estimate and the noise power feedback.

19. The medium as claimed in claim 14, further comprising the instructions that when processed by the at least one processor, cause the at least one processor to perform operations comprising:

determining a plurality of Signal-to-interference-plus-noise ratio (SINR) estimates based on a signal power computed from the reference signal symbols and a plurality of noise estimates obtained from the plurality of reserved tones of the uplink data signals.

20. The medium as claimed in claim 14, further comprising the instructions that when processed by the at least one processor, cause the at least one processor to perform operations comprising:

comparing each SINR estimate of the plurality of SINR estimates with a predetermined threshold indicative of a discontinuous transmission;

if each SINR estimate is less than the predetermined threshold:

detecting a discontinuous transmission from the at least one UE; and sending a request to the at least one UE to retransmit the plurality of uplink data signals; and if each SINR estimate is greater than a predetermined threshold:

determining based on the comparison that a transmission from the at least one UE is not a discontinuous transmission; and performing decoding of the plurality of uplink data signals.

* * * * *